United States Patent
Ljung

(10) Patent No.: US 10,390,306 B2
(45) Date of Patent: *Aug. 20, 2019

(54) TERMINAL REQUESTED BASE STATION CONTROLLED TERMINAL TRANSMISSION THROTTLING

(71) Applicant: Sony Mobile Communications AB, Lund (SE)

(72) Inventor: Rickard Ljung, Helsingborg (SE)

(73) Assignee: Sony Corporation, Tokyo (JP)

( * ) Notice: Subject to any disclaimer, the term of this patent is extended or adjusted under 35 U.S.C. 154(b) by 290 days.

This patent is subject to a terminal disclaimer.

(21) Appl. No.: 15/048,384

(22) Filed: Feb. 19, 2016

(65) Prior Publication Data

US 2016/0174159 A1 Jun. 16, 2016

Related U.S. Application Data

(63) Continuation of application No. 13/566,554, filed on Aug. 3, 2012, now Pat. No. 9,271,234.

(51) Int. Cl.
*H04W 52/02* (2009.01)
*H04W 72/12* (2009.01)
*H04W 76/28* (2018.01)

(52) U.S. Cl.
CPC ... *H04W 52/0251* (2013.01); *H04W 52/0216* (2013.01); *H04W 72/1289* (2013.01);
(Continued)

(58) Field of Classification Search
CPC ............ H04W 52/0216; H04W 76/048
(Continued)

(56) References Cited

U.S. PATENT DOCUMENTS 6,816,081 B1 * 11/2004 Okada ............... G07C 9/00182
340/12.5
7,734,262 B2 * 6/2010 Akbar Attar .......... H04W 52/34
370/208
(Continued)

FOREIGN PATENT DOCUMENTS

CN 101489291 7/2009
JP 2011-217171 10/2011
(Continued)

OTHER PUBLICATIONS

"UMTS Long Term Evolution (LTE) Technology Introduction," Rohde & Schwarz Products, p. 1-55.
(Continued)

*Primary Examiner* — Shahriar Behnamian
(74) *Attorney, Agent, or Firm* — Renner, Otto, Boisselle & Sklar, LLP

(57) ABSTRACT

A method for terminal requested base station controlled terminal transmission throttling includes transmitting a throttling request signal to the base station, the throttling request signal including data indicating to the base station to issue a discontinuous uplink transmission grant to the terminal, wherein the throttling request signal includes data representing a maximum duty cycle of forthcoming discontinuous uplink transmissions from the terminal to the base station, receiving from the base station the discontinuous uplink transmission grant, and transmitting discontinuous uplink transmissions from the terminal to the base station that do not exceed the maximum duty cycle, wherein the maximum duty cycle corresponds to discontinuous uplink transmission bursts of less than a time t corresponding to continuous uplink transmissions.

20 Claims, 6 Drawing Sheets

(52) U.S. Cl.
CPC ......... *H04W 76/28* (2018.02); *Y02D 70/1242* (2018.01); *Y02D 70/1262* (2018.01); *Y02D 70/144* (2018.01); *Y02D 70/164* (2018.01); *Y02D 70/25* (2018.01)

(58) Field of Classification Search
USPC ........................................................ 370/311
See application file for complete search history.

(56) References Cited

U.S. PATENT DOCUMENTS

| | | | |
|---|---|---|---|
| 2004/0028149 A1* | 2/2004 | Krafft | H03K 5/1252 375/316 |
| 2007/0133479 A1* | 6/2007 | Montojo | H04W 52/0216 370/335 |
| 2008/0046132 A1 | 2/2008 | Dalsgaard et al. | |
| 2008/0207150 A1 | 8/2008 | Malladi et al. | |
| 2008/0280638 A1* | 11/2008 | Malladi | H04W 52/08 455/522 |
| 2009/0046641 A1 | 2/2009 | Wang | |
| 2009/0109942 A1* | 4/2009 | Wijayanathan | H04W 76/048 370/338 |
| 2009/0323664 A1 | 12/2009 | Li et al. | |
| 2010/0254329 A1 | 10/2010 | Pan et al. | |
| 2010/0285828 A1 | 11/2010 | Panian et al. | |
| 2011/0134787 A1* | 6/2011 | Hirano | H04W 76/048 370/252 |
| 2011/0243002 A1 | 10/2011 | Tsuruoka | |
| 2012/0093093 A1 | 4/2012 | Frenger et al. | |
| 2012/0147801 A1 | 6/2012 | Ho et al. | |
| 2012/0190362 A1* | 7/2012 | Subbarayudu | H04W 76/048 455/435.1 |

FOREIGN PATENT DOCUMENTS

| | | |
|---|---|---|
| WO | 03/105494 | 12/2003 |
| WO | 2005/104588 | 11/2005 |
| WO | 2009/132329 | 10/2009 |

OTHER PUBLICATIONS

"Long Term Evolution (LTE): Overview of LTE Air-Interface Technical White Paper," Technical White Paper, Motorola, Inc., pp. 1-8.

Riikka Susitaival et al., "Internet access performance in LTE TDD," 5 pages.

International Search Report and Written Opinion for PCT/IB2013/001694; filed Aug. 1, 2013.

International Preliminary Report on Patentability dated Feb. 3, 2015 for PCT/IB2013/001694.

* cited by examiner

TERMINAL REQUESTED BASE STATION CONTROLLED TERMINAL TRANSMISSION THROTTLING

TECHNICAL FIELD OF THE INVENTION

The technology of the present disclosure relates generally to portable electronic devices and transmission equipment operable in a wireless communication network and more particularly to systems and methods for terminal requested base station controlled terminal transmission throttling.

DESCRIPTION OF THE RELATED ART

Portable electronic devices that operate in a cellular network, such as mobile telephones and smartphones, tablet computers, cellular-connected laptop computers, and similar devices are ever increasing in popularity. In a typical wireless telecommunication network, terminals (also known as mobile stations and/or user equipment (UE)) communicate via a radio access network (RAN) to one or more core networks. The RAN covers a geographical area which is divided into cell areas, with each cell area being served by a base station, e.g., a radio base station (RBS), which in some networks may also be called, for example, NodeB in UMTS or eNodeB in LTE. A cell is a geographical area where radio coverage is provided by the radio base station equipment at a base station site. Each cell is identified by an identity within the local radio area, which is broadcast in the cell. The base stations communicate over the air interface operating on radio frequencies with the terminals within range of the base stations.

In one example of a RAN, the Universal Mobile Telecommunications System (UMTS) is a wireless telecommunication system that evolved from the Global System for Mobile Communications (GSM). In UMTS the RAN is referred to as a Universal Terrestrial Radio Access Network (UTRAN). UTRAN is a RAN that uses, among other radio access technologies (RAT), wideband code division multiple access (WCDMA) for communication between the mobile station and the terminal. Base stations in UMTS are known as NodeB, which connect to a radio network controller (RCN) which supervises and coordinates various activities of the NodeB connected thereto.

In another example of a RAN, Long Term Evolution (LTE) is a wireless telecommunication system that evolved from UMTS and utilizes a RAN known as evolved Universal Terrestrial Radio Access Network (E-UTRAN). E-UTRAN is a RAN that uses a RAT also known as LTE for communication between the mobile station and the terminal. In LTE, the base stations, known as eNodeB, are connected directly to the core network rather than to an RNC. In general, in LTE the functions of the RNC are distributed between the eNodeB in the network.

In a wireless communication system, such as UMTS and LTE, one of the largest power consuming elements in the terminal and the base station is typically the power amplifier to the radio transmitter. In these systems, the maximum available output power is usually lower in the uplink direction (i.e., transmissions from terminal to base station) than the downlink direction (i.e., transmissions from base station to terminal). The reason for such asymmetric power balance may be that the terminal is battery powered and thus its power amplifiers may be power limited, while the base station connects to power lines and thus has less constrains on the amount of power consumed by the power amplifier. This asymmetric power balance causes the total network coverage to generally be limited in the uplink direction as compared to the downlink direction.

Other reasons for the uplink transmissions to be limited in terms of maximum output power include heat generation. Unlike a base station that may reside in, for example, an uninhabited hut, the terminal is often intended to be used by human users. If the terminal were to continuously transmit at its maximum specified power, it may generate too much heat, which could make the terminal unsafe or at least uncomfortable for a user to handle. Another reason for the uplink transmissions to be limited in terms of maximum output power may be the maximum instantaneous power supply available to the terminal. For example, the terminal may be powered by a USB 2.0 connector, whose total maximum current drain is 500 mA@5V.

This asymmetric power balance limitation is particularly acute when the terminal involved is in a limited output power scenario that further limits terminal power.

SUMMARY

The concept of the systems and methods disclosed herein includes the capability for a terminal in a wireless communication system to signal the base station to effectively limit the duty cycle of the terminal's transmitter to limit its power amplifier's power consumption. Since the base station controls when the terminal transmits via uplink transmission grants, the terminal operating at low power levels may request the base station to throttle uplink transmissions to reduce its power amplifier's power consumption. The concept of the systems and methods disclosed herein may include adding a control signal possibility to the wireless communication system specification. For 3GPP standards relating to LTE and UTMS this concept may involve the addition of a message into the Radio Resource Control (RRC) signaling for indication of a terminal specific recommended maximum uplink transmission duty cycle. This additional signaling message would be intended for use by terminals that currently are in a limited output power scenario, enabling the terminal to request discontinuous uplink transmission grants.

Benefits of this concept include that the terminal can maintain a connection with the network even if instantaneous output power level is higher than what would be possible in a continuous uplink transmission. This can help solve transmission power related issues in the terminal including, but not limited to, providing larger network system coverage, enabling longer terminal battery lifetime, reducing risk for terminal overheating, and managing regulatory requirements on maximum terminal energy emission (SAR).

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
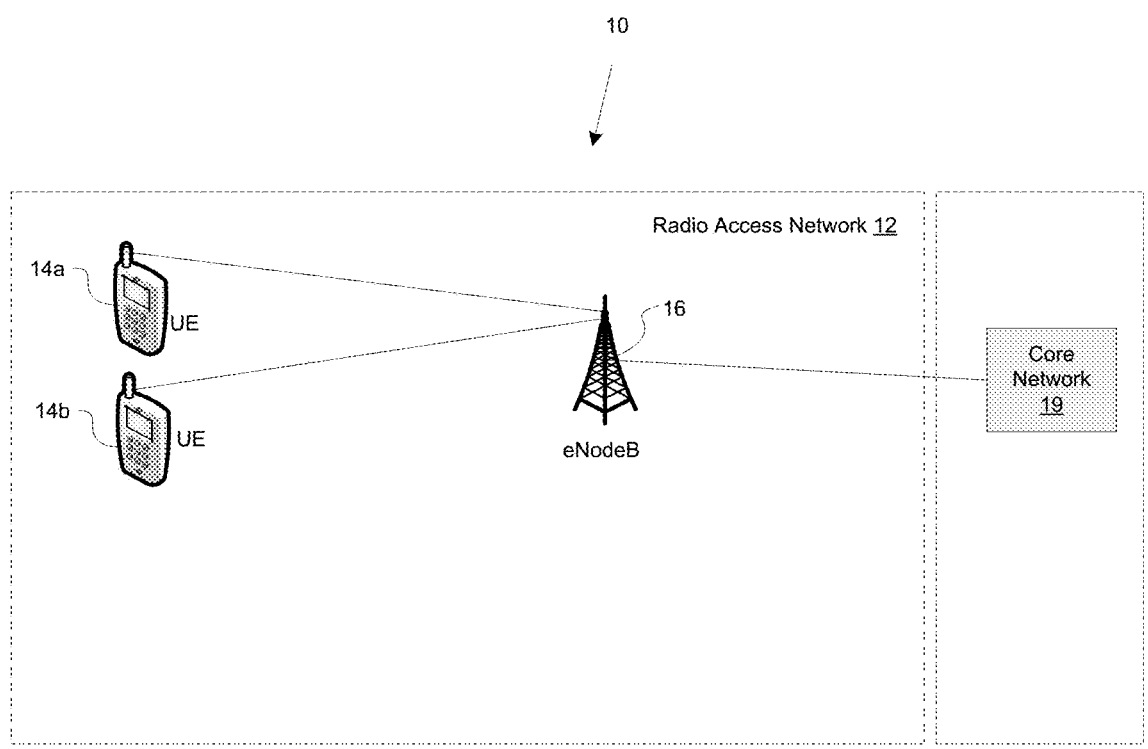
FIG. 1 illustrates a portion of a wireless telecommunications network.

Embodiments of the present invention will now be described with reference to the drawings, wherein like reference numerals are used to refer to like elements throughout. It will be understood that the figures are not necessarily to scale.

FIG. 1 illustrates a portion of a wireless telecommunications network 10. The network 10 includes a radio access network (RAN) 12. FIG. 1 illustrates the RAN 12 as an Evolved Universal Terrestrial Radio Access Network (EU-TRAN), the RAN associated with LTE, as an example. However, the RAN 12 may also be any RAN other than EUTRAN including RAN that are currently deployed as well as RAN that are currently in development or that will be developed in the future. The network 10 includes a core network 19, which includes the parts of the telecommunications network 10 that provide the various services to customers who are connected by the RAN 12.

The RAN 12 includes terminals 14a-b. The terminals 14a-b are what in LTE is referred to as user equipment (UE). In wireless telecommunications networks other than LTE, including networks that are currently deployed as well as networks that are currently in development or that will be developed in the future, the terminals may be referred to by terms other than terminals, mobile stations, or user equipment. However, the term terminals as employed herein is intended to include those terminals in wireless telecommunications networks such as UMTS and LTE as well as networks other than UMTS and LTE, and terminals in yet to be developed or deployed networks where the terminals have similar functionality as the terminals described herein in the context of LTE.

The RAN 12 further includes a base station 16. As discussed above, in LTE the base station 16 is known as eNodeB (evolved NodeB or eNB). In wireless telecommunications networks other than LTE, including networks that are currently deployed as well as networks that are currently in development or that will be developed in the future, the base stations may be referred to by terms other than base stations, NodeB, or eNodeB. However, the term base station as employed herein is intended to include those base stations in wireless telecommunications networks such as UMTS and LTE as well as networks other than UMTS and LTE, and base stations in yet to be developed or deployed networks where the base stations have similar functionality as the base stations described herein in the context of LTE. Moreover, a base station as the term is employed herein may include other entities in wireless telecommunications systems that control the uplink transmissions of the terminals in a similar manner as the base stations disclosed herein. For example, a relay node that may be made to control the uplink transmissions of the terminals behaves as a base station.

The base station 16 communicates with the terminals 14a-b using radio access technologies (RAT) via an air interface. In LTE the RAT is known as LTE and the air interface is known as LTE-Uu. Although RAN 12 has been described as discreetly LTE, in practice, base stations may be multi radio units, capable of transmitting in several different RAT. Due to the reuse of infrastructure at the cellular sites, as well as backhaul capabilities, a single base station may be using more than one RAT and may be transmitting at more than one carrier frequency.

In many communication systems such as LTE the base station 16 has control over when the terminals 14a-b are allowed to transmit uplink transmissions, and for this purpose the base station 16 provides uplink transmission grants that control when the terminal is allowed to transmit. In this manner, the base station 16 can control system aspects such as data transmissions scheduling to optimize uplink transmission capacity, and to control the total uplink interference levels. The procedure to transmit data in the uplink direction after data has arrived to the terminal's buffer is typically as follows: 1) in the subframe where the base station 16 has a scheduling request (SR) resource available, the terminal transmits an SR, which is a one-bit flag to indicate that the terminal 14a or 14b has new data, 2) the base station 16 receives the SR and after a processing delay, an initial uplink transmission grant is transmitted to the terminal 14a or 14b allocating time/frequency resources for uplink transmission, 3) using the granted resources, the terminal 14a or 14b transmits data as well as a Buffer Status Report (BSR) to indicate to the base station 16 how much data it still has available in its buffer after the transmission, 4) when the base station 16 has received the BSR, it can continue allocating uplink resources to the terminal 14a or 14b and the terminal 14a or 14b can perform further uplink transmissions. Decisions regarding scheduling of uplink resources may be based on quality of service (QoS) parameters, buffer status, uplink channel quality measurements, terminal capabilities, etc.

In the RAN 12 the terminals 14a-b determine whether terminal power consumption needs to be reduced. The terminal's power consumption may need to be reduced because the terminal is at risk of overheating, because there is a shortage of power supply to the terminal, or because the terminal is at risk of exceeding Specific Absorption Rate (SAR) regulatory requirements, among other potential reasons. Whenever the terminal 14a or 14b determines that terminal power consumption needs to be reduced, the terminal 14a or 14b signals the base station 16 (e.g., via the radio resource control (RRC) layer) to issue a discontinuous uplink transmission grant to the terminal 14 or 14b. The base station 16, in turn, issues the discontinuous uplink transmission grant effectively limiting the terminal's power consumption.

Similarly, whenever the terminal 14*a* or 14*b* determines that terminal power consumption no longer needs to be reduced, the terminal 14*a* or 14*b* signals the base station 16 to essentially inform the base station 16 that throttling is no longer necessary. The base station 16, in turn, ceases to issue the discontinuous uplink transmission grant or issues a non-discontinuous uplink transmission grant.

RRC signaling is specified in 3GPP TS 25.331 for UTMS and TS 36.331 for LTE. A new message bit pattern could be included in the terminal capability update procedure. In one embodiment, the new message includes data representing a maximum duty cycle for the uplink transmission grant that may be signaled, for example, by one, two or three bits, giving the possibility for two, four, or eight duty cycle levels, respectively. Since several duty cycle levels are specified, in one embodiment, the same RRC signaling message can be reused by the terminal 14*a* or 14*b* currently being throttled to request the base station 16 to conclude throttling and/or to issue non-discontinuous uplink transmission grants.

Figure 2A:
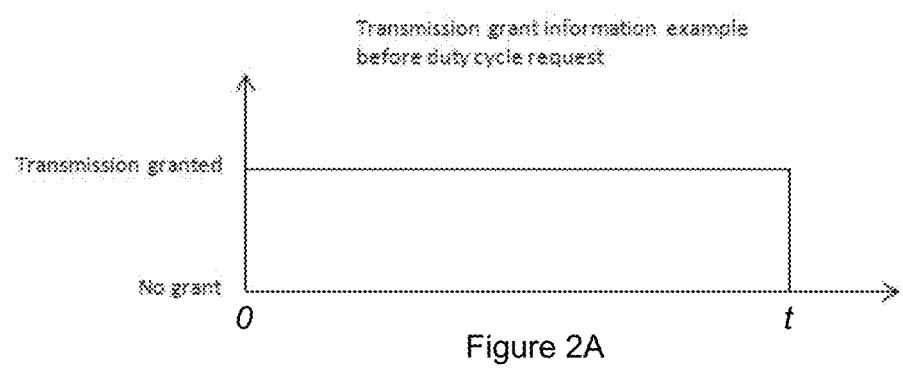
FIGS. 2A and 2B show diagrams illustrating an exemplary potential difference in terminal transmission grants before (FIG. 2A) and after (FIG. 2B) the terminal has signaled to the base station to issue discontinuous uplink transmission grants.
Figure 2B:
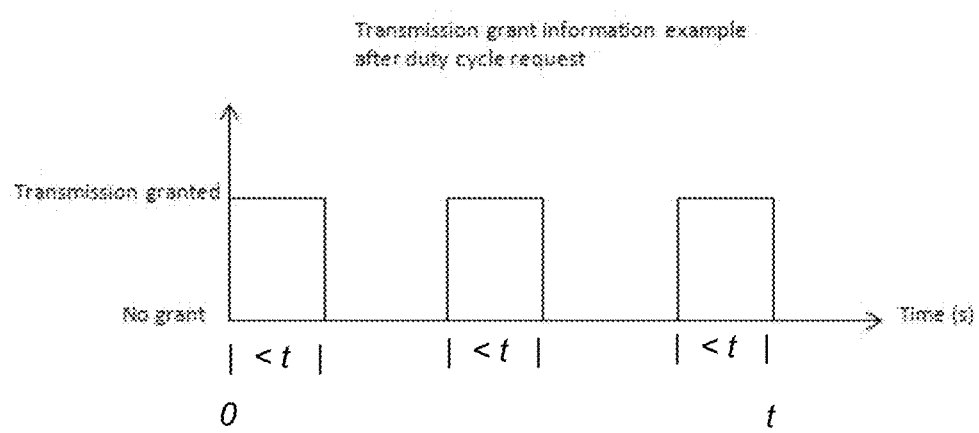

FIGS. 2A and 2B show diagrams illustrating an exemplary potential difference in terminal transmission grants before (FIG. 2A) and after (FIG. 2B) the terminal has signaled to the base station to issue discontinuous uplink transmission grants. The illustrated uplink transmission grants are merely exemplary and the base station can provide many other different uplink transmission grants. In the example of FIG. 2A continuous transmission is granted before the terminal signals the base station for discontinuous uplink transmission grants. Thus, before the terminal signals to the base station to issue discontinuous uplink transmission grants, the base station allows the terminal to transmit for a time t. Once the terminal signals the base station for discontinuous uplink transmission grants, as FIG. 2B shows, discontinuous transmission is granted and thus uplink transmissions are limited to transmission bursts of less than time t after the discontinuous transmission uplink grants are received.

In one embodiment, the terminal transmits a requests signal that includes data representing a maximum duty cycle for the discontinuous uplink transmission grant. In one embodiment, the data representing the maximum duty cycle corresponds to 1 bit representing two potential maximum duty cycle levels. Possible maximum duty cycle levels with 1 bit signaling include approximately ⅓ duty cycle and approximately ⅔ duty cycle, and approximately ½ duty cycle and approximately 100% duty cycle. In another embodiment, the data representing the maximum duty cycle corresponds to 2 bit representing four potential maximum duty cycle levels. Possible maximum duty cycle levels with 2 bit signaling include approximately ⅕ duty cycle, approximately ⅖ duty cycle, approximately ⅗ duty cycle and approximately ⅘ duty cycle, and approximately ¼ duty cycle, approximately ½ duty cycle, approximately ¾ duty cycle and approximately 100% duty cycle. In yet another embodiment, the data representing the maximum duty cycle corresponds to 3 bit representing eight potential maximum duty cycle levels. Possible maximum duty cycle levels with 3 bits signaling include approximately ⅑ duty cycle, approximately 2/9 duty cycle, approximately ⅓ duty cycle, approximately 4/9 duty cycle, approximately 5/9 duty cycle, approximately 6/9 duty cycle, approximately 7/9 duty cycle, and approximately 8/9 duty cycle; and approximately ⅛ duty cycle, approximately ¼ duty cycle, approximately ⅜ duty cycle, approximately ½ duty cycle, approximately ⅝ duty cycle, approximately ¾ duty cycle, approximately ⅞ duty cycle, and approximately 100% duty cycle.

Figure 3:
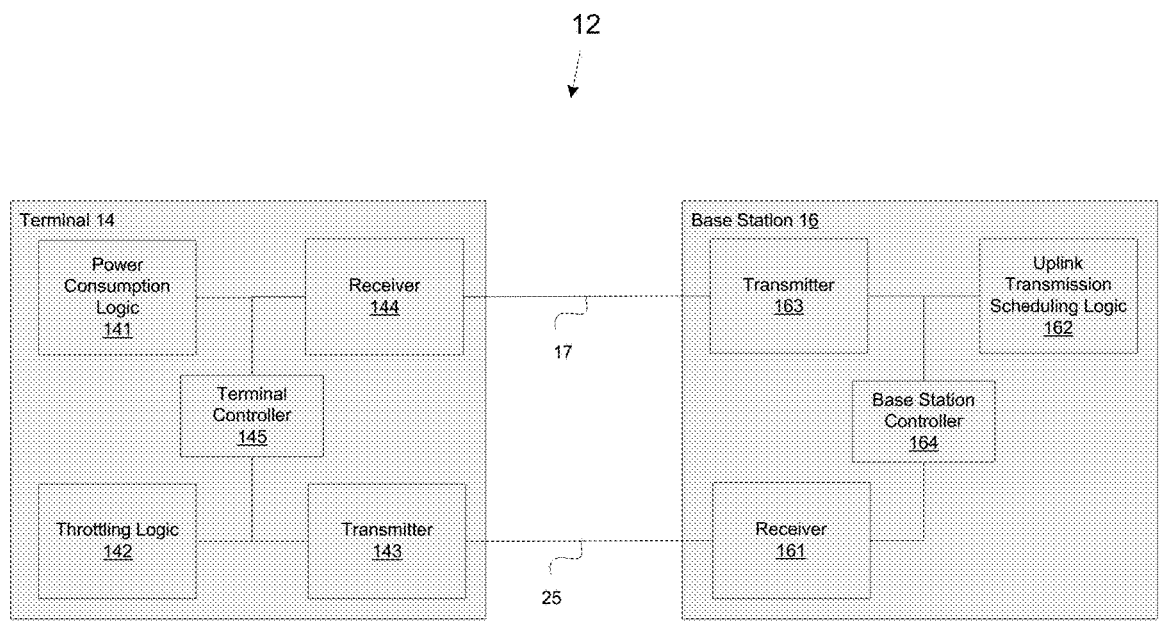
FIG. 3 illustrates a schematic diagram of a radio access network (RAN) including exemplary block diagrams of a terminal and a base station.

FIG. 3 illustrates a schematic diagram of the RAN 12 including exemplary block diagrams of the terminal 14 and the base station 16.

The terminal 14 includes a power consumption logic 141 that determines whether terminal power consumption is to be reduced. In one embodiment, the power consumption logic 141 determines that terminal power consumption is to be reduced because it determines that the terminal 14 is overheating or at risk of overheating. In another embodiment, the power consumption logic 141 determines that terminal power consumption is to be reduced because it determines that a shortage power supply to the terminal 14 exists. In yet another embodiment, the power consumption logic 141 determines that terminal power consumption is to be reduced because it determines that the terminal 14 has exceeded or is at risk of exceeding Specific Absorption Rate (SAR) regulatory requirements. When the power consumption logic 141 determines that terminal power consumption is to be reduced, it issues an indication.

The terminal 14 also includes a throttling logic 142 that receives from the power consumption logic 141 the indication as to whether the terminal power consumption is to be reduced. When the throttling logic 142 receives from the power consumption logic 141 the indication that the terminal power consumption is to be reduced, the throttling logic 142 encodes a throttling request signal including data for transmission to the base station 16 and indicating to the base station 16 to issue a discontinuous uplink transmission grant to the terminal 14.

The terminal 14 further includes a transmitter 143 that transmits the throttling request signal, and a receiver 144 configured to receive from the base station 16 the uplink transmission grants. In one embodiment, the transmitter 143 transmits the throttling request signal via a radio resource control (RRC) layer 25.

The terminal 14 further includes a terminal controller 145 operatively connected to the power consumption logic 141, the throttling logic 142, the transmitter 143, and the receiver 144 to thereby control the terminal 14.

The base station 16 includes a receiver 161 that receives the throttling request signal from the terminal 14 and an uplink transmission scheduling logic 162 connected the receiver 161 and that generates a discontinuous uplink transmission grant signal upon receiving of the throttling request signal. The base station 16 further includes a transmitter 163 connected to the uplink transmission scheduling logic 162 that transmits the discontinuous uplink transmission grant signal to the terminal 14. In one embodiment, the transmitter 163 transmits the discontinuous uplink transmission grant signal to the receiver 144 via the Physical Control Channel (PDCCH) 17 as specified for LTE, while in other embodiments other channels are used.

The base station 16 further includes a base station controller 164 operatively connected to the receiver 161, the uplink transmission scheduling logic 162, and the transmitter 163 to thereby control the base station 16.

In one embodiment, the power consumption logic 141 also determines whether the terminal power consumption no longer needs to be reduced. In one embodiment, the power consumption logic 141 determines that terminal power consumption is no longer to be reduced because it determines that the terminal 14 is no longer at risk of overheating, that the shortage power supply to the terminal 14 no longer exists, or that the terminal 14 is no longer at risk of exceeding SAR regulatory requirements. When the power consumption logic 141 determines that terminal power consumption no longer is to be reduced, it issues another indication. The throttling logic 142 receives from the power consumption logic 141 the indication as to whether the terminal power consumption is no longer to be reduced and encodes a second throttling request signal including data indicating to the base station 16 to no longer issue the discontinuous uplink transmission grant to the terminal 14. The transmitter 143 transmits the second throttling request signal. In this case, the receiver 161 receives the second throttling request signal from the requesting terminal 14 and the uplink transmission scheduling logic 162, upon the receiving of the second throttling request signal, generates a non-discontinuous uplink transmission grant signal for the transmitter 163 to transmit to the requesting terminal 14.

Figure 4:
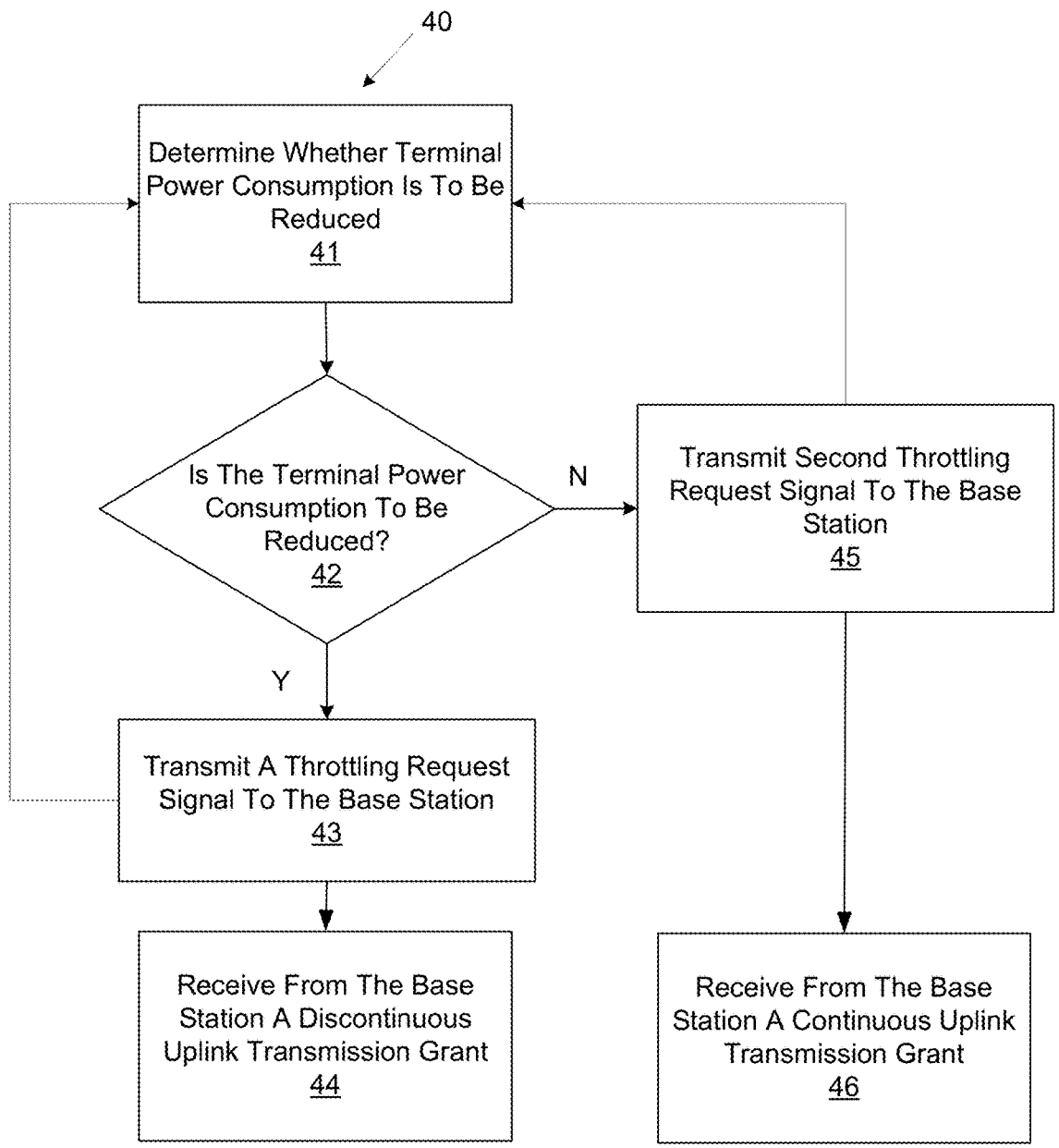
FIG. 4 illustrates a logical flow of a method for terminal requested base station controlled terminal transmission throttling.
Figure 5:
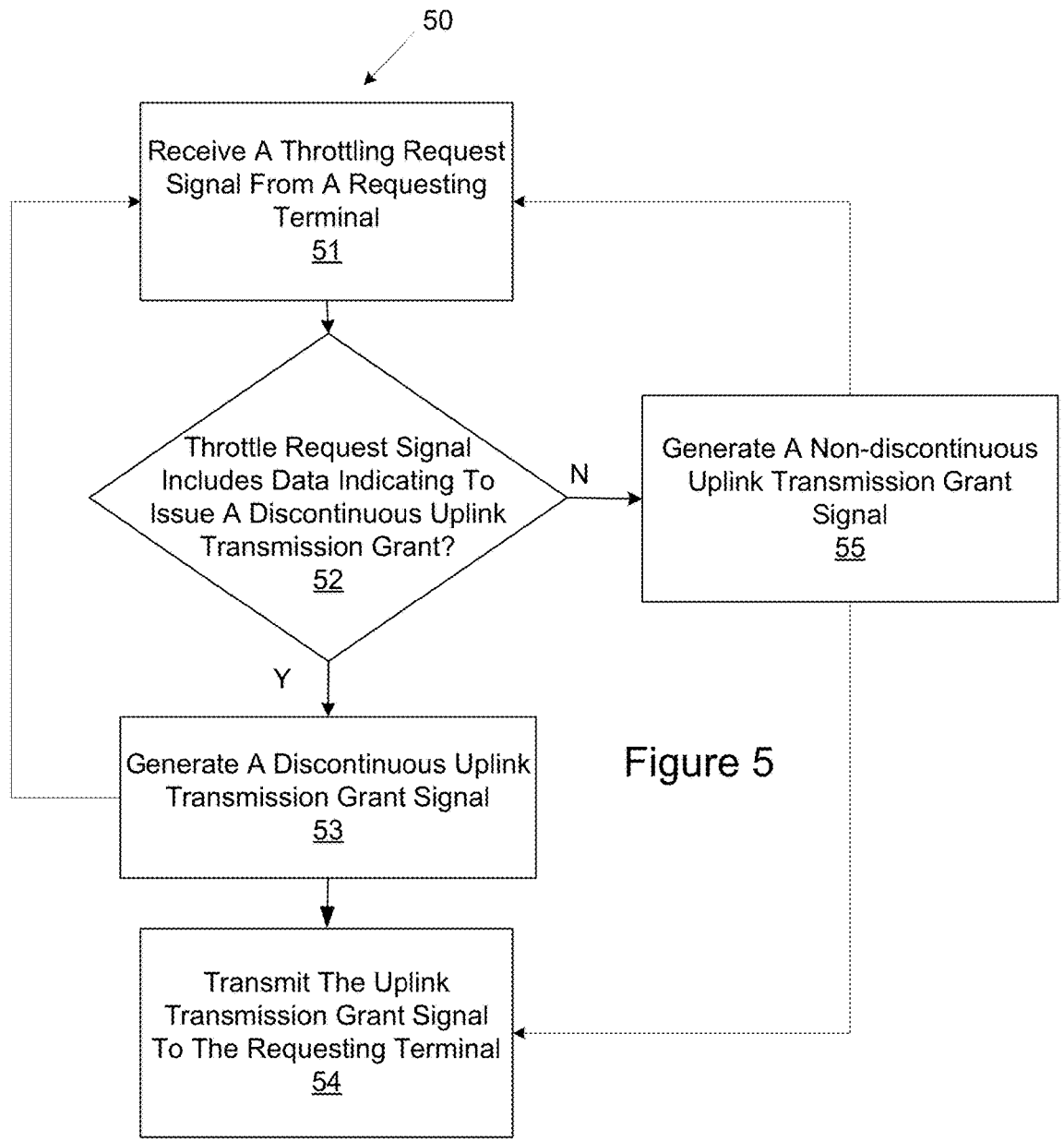
FIG. 5 illustrates logical flow of a method for an electronic device for operation in a wireless telecommunication system including terminal requested base station controlled terminal transmission throttling is shown.

In accordance with the above features, FIGS. 4 and 5 show flowcharts that illustrate logical operations to implement exemplary methods for dynamic adaptation of one or more communication parameters for communication between a base station and a terminal in a wireless telecommunications network. The exemplary methods may be carried out by executing embodiments of the base stations, terminals, mobile telephones, flash devices or machine-readable storage media disclosed herein, for example. Thus, the flowcharts of FIGS. 4 and 5 may be thought of as depicting steps of a method carried out in the above-disclosed systems or devices by operation of hardware, software, or combinations thereof. Although FIGS. 4 and 5 show a specific order of executing functional logic blocks, the order of executing the blocks may be changed relative to the order shown. Also, two or more blocks shown in succession may be executed concurrently or with partial concurrence. Certain blocks also may be omitted.

In reference to FIG. 4, logical flow of a method 40 for terminal requested base station controlled terminal transmission throttling includes, at 41, determining whether terminal power consumption is to be reduced. At 42, if the terminal power consumption is to be reduced, at 43, transmit a throttling request signal to the base station for the base station to issue a discontinuous uplink transmission grant to the terminal and return to 41 to determining whether terminal power consumption is to be reduced. Also, at 44, the method 40 includes receiving from the base station a discontinuous uplink transmission grant. Back to 42, if the terminal power consumption is not to be reduced, at 45, the method 40 includes, transmitting the second throttling request signal to the base station and return to 41 to determining whether terminal power consumption is to be reduced. In one embodiment, the transmitting the second throttling request signal to the base station occurs only if a discontinuous uplink transmission grant was previously received by the terminal. Also, at 46, the method 40 includes receiving from the base station a non-discontinuous uplink transmission grant.

In reference to FIG. 5, logical flow of a method 50 for an electronic device for operation in a wireless telecommunication system including terminal requested base station controlled terminal transmission throttling is shown. At 51, the method 50 includes receiving a throttling request signal from a requesting terminal. At 52, if the throttling request signal includes data indicating to issue a discontinuous uplink transmission grant to the terminal, at 53, generate a discontinuous uplink transmission grant signal, and, at 54, transmit the uplink transmission grant signal to the requesting terminal. Back to 52, if the throttling request signal includes data indicating to not issue the discontinuous uplink transmission grant to the terminal, at 55, generate a non-discontinuous uplink transmission grant signal and, at 54, transmit the uplink transmission grant signal to the requesting terminal.

Figure 6:
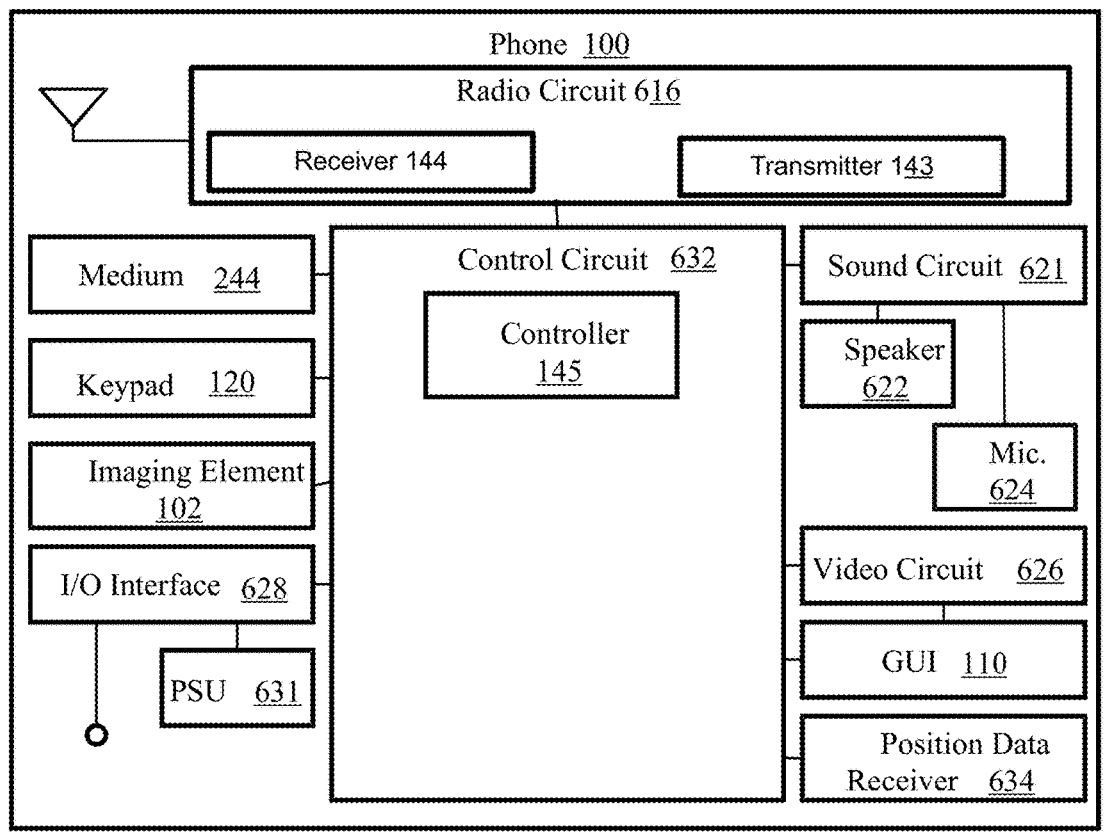
FIG. 6 illustrates a detailed block diagram of an exemplary terminal, which in the illustrated embodiment is represented by a mobile phone.

FIG. 6 illustrates a detailed block diagram of an exemplary terminal, which in the illustrated embodiment is represented by the mobile phone 100. The phone 100 includes a control circuit 632 that is responsible for overall operation of the phone 100. For this purpose, the control circuit 632 includes the terminal controller 145 that executes various applications, including applications related to or that form part of the phone 100 functioning as a terminal.

In one embodiment, functionality of the phone 100 acting as the terminal described above in reference to FIGS. 1-5 are embodied in the form of executable logic (e.g., lines of code, software, or a program) that is stored in the non-transitory computer readable medium 244 (e.g., a memory, a hard drive, etc.) of the phone 100 and is executed by the control circuit 632. The described operations may be thought of as a method that is carried out by the phone 100. Variations to the illustrated and described techniques are possible and, therefore, the disclosed embodiments should not be considered the only manner of carrying out phone 100 functions.

The phone 100 further includes the GUI 110, which may be coupled to the control circuit 632 by a video circuit 626 that converts video data to a video signal used to drive the GUI 110. The video circuit 626 may include any appropriate buffers, decoders, video data processors and so forth.

The phone 100 further includes communications circuitry that enables the phone 100 to establish communication connections such as a telephone call. In the exemplary embodiment, the communications circuitry includes a radio circuit 616. The radio circuit 616 includes one or more radio frequency transceivers including the receiver 144, the transmitter 143 and an antenna assembly (or assemblies). Since the phone 100 is capable of communicating using more than one standard, the radio circuit 616 including the receiver 144 and the transmitter 143 represents each radio transceiver and antenna needed for the various supported connection types. The radio circuit 616 including the receiver 144 and the transmitter 143 further represents any radio transceivers and antennas used for local wireless communications directly with an electronic device, such as over a Bluetooth interface.

As indicated, the phone 100 includes the primary control circuit 632 that is configured to carry out overall control of the functions and operations of the phone 100. The terminal controller 145 of the control circuit 632 may be a central processing unit (CPU), microcontroller or microprocessor. The terminal controller 145 executes code stored in a memory (not shown) within the control circuit 632 and/or in a separate memory, such as the machine-readable storage medium 244, in order to carry out operation of the phone 100. The machine-readable storage medium 244 may be, for example, one or more of a buffer, a flash memory, a hard drive, a removable media, a volatile memory, a non-volatile memory, a random access memory (RAM), or other suitable device. In a typical arrangement, the machine-readable storage medium 244 includes a non-volatile memory for long term data storage and a volatile memory that functions as system memory for the control circuit 632. The machine-readable storage medium 244 may exchange data with the control circuit 632 over a data bus. Accompanying control lines and an address bus between the machine-readable storage medium 244 and the control circuit 632 also may be present. The machine-readable storage medium 244 is considered a non-transitory computer readable medium. In one embodiment, data regarding the indication is stored in the machine-readable storage medium 244.

The phone 100 may further include a sound circuit 621 for processing audio signals. Coupled to the sound circuit 621 are a speaker 622 and a microphone 624 that enable a user to listen and speak via the phone 100, and hear sounds generated in connection with other functions of the device 100. The sound circuit 621 may include any appropriate buffers, encoders, decoders, amplifiers and so forth.

The phone 100 may further include a keypad 120 that provides for a variety of user input operations as described above in reference to FIG. 1. The phone 100 may further include one or more input/output (I/O) interface(s) 628. The I/O interface(s) 628 may be in the form of typical electronic device I/O interfaces and may include one or more electrical connectors for operatively connecting the phone 100 to another device (e.g., a computer) or an accessory (e.g., a personal handsfree (PHF) device) via a cable. Further, operating power may be received over the I/O interface(s) 628 and power to charge a battery of a power supply unit (PSU) 631 within the phone 100 may be received over the I/O interface(s) 628. The PSU 631 may supply power to operate the phone 100 in the absence of an external power source.

The phone 100 also may include various other components. For instance, the imaging element 102 may be present for taking digital pictures and/or movies. Image and/or video files corresponding to the pictures and/or movies may be stored in the machine-readable storage medium 244. As another example, a position data receiver 634, such as a global positioning system (GPS) receiver, may be present to assist in determining the location of the phone 100.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method for terminal requested base station controlled terminal transmission throttling, the method comprising:
    transmitting a throttling request signal to the base station, the throttling request signal including data indicating to the base station to issue a discontinuous uplink transmission grant to the terminal, wherein the throttling request signal includes data representing a maximum duty cycle of forthcoming discontinuous uplink transmissions from the terminal to the base station;
    receiving from the base station the discontinuous uplink transmission grant, wherein the discontinuous uplink transmission grant includes data representing time resources allocated to the terminal and which instructs the terminal to limit transmissions in the uplink direction but not in the downlink direction to not exceed the maximum duty cycle; and
    transmitting discontinuous uplink transmissions from the terminal to the base station that do not exceed the maximum duty cycle, wherein the maximum duty cycle corresponds to discontinuous uplink transmission bursts of less than a time t corresponding to a continuous uplink transmission.

2. The method of claim 1, wherein the transmitting the throttling request signal to the base station includes transmitting the throttling request signal via the radio resource control (RRC) layer.

3. The method of claim 1, wherein the data representing the maximum duty cycle corresponds to 1 bit representing two potential maximum duty cycle levels of the forthcoming discontinuous uplink transmissions, the maximum duty cycle levels selected from the group consisting of:
    ⅓ duty cycle and ⅔ duty cycle; and
    ½ duty cycle and 100% duty cycle.

4. The method of claim 1, wherein the data representing the maximum duty cycle corresponds to 2 bits representing four potential maximum duty cycle levels of the forthcoming discontinuous uplink transmissions, the maximum duty cycle levels selected from the group consisting of:
    ⅕ duty cycle, ⅖ duty cycle, ⅗ duty cycle, and ⅘ duty cycle; and
    ¼ duty cycle, ½ duty cycle, ¾ duty cycle, and 100% duty cycle.

5. The method of claim 1, wherein the data representing the maximum duty cycle corresponds to 3 bits representing eight potential maximum duty cycle levels of the forthcoming discontinuous uplink transmissions, the maximum duty cycle levels selected from the group consisting of:
    ⅑ duty cycle, 2/9 duty cycle, ⅓ duty cycle, 4/9 duty cycle, 5/9 duty cycle, 6/9 duty cycle, 7/9 duty cycle, and 8/9 duty cycle; and
    ⅛ duty cycle, ¼ duty cycle, ⅜ duty cycle, ½ duty cycle, ⅝ duty cycle, ⅜ duty cycle, ⅞ duty cycle, and 100% duty cycle.

6. The method of claim 1, comprising:
    transmitting a second throttling request signal to the base station, the second throttling request signal including data indicating to the base station to no longer issue the discontinuous uplink transmission grant to the terminal.

7. The method of claim 1, wherein the terminal includes a buffer, the method further comprising:
    transmitting only discontinuous uplink transmissions from the terminal to the base station that do not exceed the maximum duty cycle even when there is additional data in the terminal's buffer to be transmitted from the terminal to the base station.

8. The method of claim 1, including
    determining whether terminal power consumption is to be reduced, wherein the determining whether terminal power consumption is to be reduced includes at least one of:
        determining that the terminal is at risk of overheating,
        determining a shortage power supply to the terminal, and
        determining that the terminal is at risk of exceeding Specific Absorption Rate (SAR) regulatory requirements;
    transmitting the throttling request signal to the base station when the terminal power consumption is to be reduced, and
    when the terminal power consumption is no longer to be reduced, transmitting a second throttling request signal to the base station, the second throttling request signal including data indicating to the base station to no longer issue the discontinuous uplink transmission grant to the terminal.

9. A terminal for operation in a wireless telecommunication system including terminal requested base station controlled terminal transmission throttling, the terminal comprising:
    a buffer having stored therein data to be transmitted from the terminal to the base station;
    a throttling logic configured to encode a throttling request signal including data indicating to the base station to issue a discontinuous uplink transmission grant to the terminal, wherein the throttling request signal includes data representing a maximum duty cycle of forthcoming discontinuous uplink transmissions of the data stored in the buffer from the terminal to the base station;

a transmitter configured to transmit the throttling request signal; and a receiver configured to receive from the base station the discontinuous uplink transmission grant, wherein the discontinuous uplink transmission grant includes data representing time resources allocated to the terminal and which instructs the terminal to limit transmissions in the uplink direction but not in the downlink direction to not exceed the maximum duty cycle, wherein the transmitter is further configured to, upon the receiver receiving from the base station the discontinuous uplink transmission grant, transmit discontinuous uplink transmissions from the terminal to the base station that do not exceed the maximum duty cycle, wherein the maximum duty cycle corresponds to discontinuous uplink transmission bursts of less than a time t corresponding to a continuous uplink transmission.

10. The terminal of claim 9, wherein the transmitter is configured to transmit the throttling request signal via a radio resource control (RRC) layer.

11. The terminal of claim 9, wherein the data representing the maximum duty cycle corresponds to 1 bit representing two potential maximum duty cycle levels of the forthcoming discontinuous uplink transmissions, the maximum duty cycle levels selected from the group consisting of:
⅓ duty cycle and ⅔ duty cycle; and
½ duty cycle and 100% duty cycle.

12. The terminal of claim 9, wherein the data representing the maximum duty cycle corresponds to 2 bits representing four potential maximum duty cycle levels of the forthcoming discontinuous uplink transmissions, the maximum duty cycle levels selected from the group consisting of:
⅕ duty cycle, ⅖ duty cycle, ⅗ duty cycle, and ⅘ duty cycle; and
¼ duty cycle, ½ duty cycle, ¾ duty cycle, and 100% duty cycle.

13. The terminal of claim 9, wherein the data representing the maximum duty cycle corresponds to 3 bits representing eight potential maximum duty cycle levels of the forthcoming discontinuous uplink transmissions, the maximum duty cycle levels selected from the group consisting of:
⅑ duty cycle, 2/9 duty cycle, ⅓ duty cycle, 4/9 duty cycle, 5/9 duty cycle, 6/9 duty cycle, 7/9 duty cycle, and 8/9 duty cycle; and
⅛ duty cycle, ¼ duty cycle, ⅜ duty cycle, ½ duty cycle, ⅝ duty cycle, ¾ duty cycle, ⅞ duty cycle, and 100% duty cycle.

14. The terminal of claim 9, wherein the transmitter is further configured to, upon the receiver receiving from the base station the discontinuous uplink transmission grant, transmit only discontinuous uplink transmissions from the terminal to the base station that do not exceed the maximum duty cycle regardless of whether there is additional data in the buffer to be transmitted from the terminal to the base station.

15. The terminal of claim 9, including:
a power consumption logic configured to determine whether terminal power consumption is to be reduced;

wherein the throttling logic is configured to receive from the power consumption logic an indication as to whether the terminal power consumption is to be reduced, wherein the throttling logic is configured to, upon receiving from the power consumption logic the indication that the terminal power consumption is to be reduced, encode the throttling request signal.

16. The terminal of claim 10, wherein:
the power consumption logic is further configured to determine whether the terminal power consumption is no longer to be reduced,
the throttling logic is further configured to receive from the power consumption logic an indication as to whether the terminal power consumption is no longer to be reduced, wherein the throttling logic is configured to, upon receiving from the power consumption logic the indication that the terminal power consumption is no longer to be reduced, encode a second throttling request signal including data indicating to the base station to no longer issue the discontinuous uplink transmission grant to the terminal, and
the transmitter is further configured to transmit the second throttling request signal.

17. An electronic device for operation in a wireless telecommunication system including terminal requested base station controlled terminal transmission throttling, the device comprising:
a receiver configured to receive a throttling request signal from a requesting terminal, the throttling request signal including data indicating to issue a discontinuous uplink transmission grant to the requesting terminal, wherein the throttling request signal includes data representing a maximum duty cycle of forthcoming discontinuous uplink transmissions from the terminal to the base station;
an uplink transmission scheduling logic operatively connected to the receiver and configured to, upon the receiver receiving the throttling request signal including data indicating to issue a discontinuous uplink transmission grant to the terminal, generate a discontinuous uplink transmission grant signal that includes data representing time resources allocated to the terminal and which instructs the requesting terminal to limit transmissions in the uplink direction but not in the downlink direction to not exceed the maximum duty cycle, wherein the maximum duty cycle corresponds to discontinuous uplink transmission bursts of less than a time t corresponding to continuous uplink transmissions; and
a transmitter operatively connected to the uplink transmission scheduling logic and configured to transmit the discontinuous uplink transmission grant signal to the requesting terminal.

18. The device of claim 17, wherein the receiver is configured to receive the throttling request signal via a radio resource control (RRC) layer.

19. The device of claim 17, wherein the data representing the maximum duty cycle corresponds to at least one of:
1 bit representing two potential maximum duty cycle levels of the forthcoming discontinuous uplink transmissions, the maximum duty cycle levels selected from the group consisting of:
⅓ duty cycle and ⅔ duty cycle, and
½ duty cycle and 100% duty cycle;

2 bits representing four potential maximum duty cycle levels of the forthcoming discontinuous uplink transmissions, the maximum duty cycle levels selected from the group consisting of:
⅕ duty cycle, ⅖ duty cycle, ⅗ duty cycle and ⅘ duty cycle, and
¼ duty cycle, ½ duty cycle, ¾ duty cycle, and 100% duty cycle; and
3 bits representing eight potential maximum duty cycle levels of the forthcoming discontinuous uplink transmissions, the maximum duty cycle levels selected from the group consisting of:
⅑ duty cycle, 2/9 duty cycle, ⅓ duty cycle, 4/9 duty cycle, 5/9 duty cycle, 6/9 duty cycle, 7/9 duty cycle, and 8/9 duty cycle, and
⅛ duty cycle, ¼ duty cycle, ⅜ duty cycle, ½ duty cycle, ⅝ duty cycle, ⅜ duty cycle, ⅞ duty cycle, and 100% duty cycle.

20. The device of claim 17, wherein:
the receiver is further configured to receive a second throttling request signal from the requesting terminal, the second throttling request signal including data indicating to no longer issue the discontinuous uplink transmission grant to the terminal;
the uplink transmission scheduling logic is further configured to, upon the receiver receiving the second throttling request signal, generate a non-discontinuous uplink transmission grant signal; and
the transmitter is further configured to transmit the non-discontinuous uplink transmission grant signal to the requesting terminal.

* * * * *